US012805494B2

(12) United States Patent
Brauers et al.

(10) Patent No.: US 12,805,494 B2
(45) Date of Patent: Nov. 24, 2026

(54) LIGHT SYSTEM FOR AQUARIUM AND METHODS

(71) Applicant: Spectrum Brands, Inc., Middleton, WI (US)

(72) Inventors: Thomas Brauers, Bielefeld (DE); Bernd Wallmeier, Ibbenbüren (DE)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 19/009,728

(22) Filed: Jan. 3, 2025

(65) Prior Publication Data

US 2025/0134077 A1 May 1, 2025

Related U.S. Application Data

(63) Continuation of application No. 17/784,390, filed as application No. PCT/US2020/064199 on Dec. 10, 2020, now Pat. No. 12,193,420.

(60) Provisional application No. 62/948,017, filed on Dec. 13, 2019.

(51) Int. Cl.
*A01K 63/06* (2006.01)
*A01K 63/00* (2017.01)

(52) U.S. Cl.
CPC ............ *A01K 63/06* (2013.01); *A01K 63/006* (2013.01)

(58) Field of Classification Search
CPC ...................................................... A01K 63/06
USPC .................................................. 362/277–284
See application file for complete search history.

(56) References Cited

U.S. PATENT DOCUMENTS

| | | | | |
|---|---|---|---|---|
| 3,857,366 A | | 12/1974 | Willinger | |
| 4,074,124 A | * | 2/1978 | Maute | A01K 63/06 362/280 |
| 4,739,454 A | * | 4/1988 | Federgreen | H01R 33/08 362/277 |
| 5,479,327 A | | 12/1995 | Chen | |
| 8,070,323 B2 | * | 12/2011 | Wechsler | A01G 9/249 362/228 |
| 8,919,991 B2 | | 12/2014 | Lee et al. | |

(Continued)

FOREIGN PATENT DOCUMENTS

| | | |
|---|---|---|
| CN | 102232366 | 11/2011 |
| CN | 105010225 | 11/2015 |

(Continued)

OTHER PUBLICATIONS

International Search Report and Written Opinion for PCT/US2020/064199 (Mar. 29, 2021).

(Continued)

*Primary Examiner* — Joshua J Michener
*Assistant Examiner* — Nicole Paige Maccrate
(74) *Attorney, Agent, or Firm* — Greenberg Traurig, LLP

(57) ABSTRACT

A light system for an aquarium includes an aquarium tank and a lid covering the open top of the tank. The lid is pivotably attached to the tank and is pivotable between a covered position and uncovered position. A light source is secured to an interior portion of the lid and moves with the lid between the covered position and uncovered position. The light source emits a light beam. An alignment arrangement is provided for the light source and is constructed and arranged to ensure the light beam projects into the tank interior volume regardless of the position of the lid and light source.

6 Claims, 8 Drawing Sheets

(56) References Cited

U.S. PATENT DOCUMENTS

| | | | | |
|---|---|---|---|---|
| 8,973,532 | B2 * | 3/2015 | Fredricks | A01K 63/06 119/265 |
| RE48,022 | E * | 6/2020 | Tang | A01K 1/03 |
| 12,193,420 | B2 * | 1/2025 | Brauers | A01K 63/006 |
| 2005/0109285 | A1 | 5/2005 | Hickok et al. | |
| 2007/0051321 | A1 | 3/2007 | Chang | |
| 2010/0265697 | A1 * | 10/2010 | Fredricks | A01K 63/06 362/101 |
| 2011/0255266 | A1 * | 10/2011 | Fredricks | A01K 63/06 362/101 |
| 2013/0107537 | A1 * | 5/2013 | Lee | F21K 9/272 362/283 |
| 2013/0265746 | A1 | 10/2013 | May | |
| 2014/0251227 | A1 * | 9/2014 | Wang | A01K 63/003 119/265 |
| 2014/0293595 | A1 | 10/2014 | May | |

FOREIGN PATENT DOCUMENTS

| | | | |
|---|---|---|---|
| JP | 05-080257 | U | 11/1993 |
| JP | 08298896 | | 11/1996 |
| KR | 10-1999-0025754 | A | 4/1999 |
| KR | 10-0702681 | B1 | 4/2007 |
| KR | 10-0866395 | B1 | 11/2008 |
| KR | 10-1920253 | B1 | 11/2018 |
| WO | 2012/067296 | A1 | 5/2012 |

OTHER PUBLICATIONS

Extended European Search Report for Application No. 20900532.1 dated Nov. 13, 2023, 12 pages.

* cited by examiner

LIGHT SYSTEM FOR AQUARIUM AND METHODS

CROSS-REFERENCE TO RELATED APPLICATION

This application is a continuation of U.S. patent application Ser. No. 17/784,390, filed Jun. 10, 2022, which is a U.S. National Stage Application of PCT/US2020/064199, filed Dec. 10, 2020, which claims the benefit of priority to U.S. Patent Application Ser. No. 62/948,017, filed on Dec. 13, 2019, which applications are incorporated herein by reference. To the extent appropriate, a claim of priority is made to each of the above disclosed applications.

TECHNICAL FIELD

This disclosure relates to lighting used for aquariums. In particular, this disclosure relates to lighting alignment in aquariums and methods of use.

BACKGROUND

Many aquariums have lids with lighting under the lid. To maintain the aquarium, the lid needs to be opened, so that the interior of the aquarium can be accessed. In typical prior art aquarium lighting systems, the light is secure to the aquarium lid, so that when the aquarium lid is pivoted open, the light pivots with the lid and shines in the eyes of the person servicing the aquarium. In many cases, the light is perceived as disturbing and is switched off.

For the illumination of the aquarium during maintenance and care work, an external light source is often provided. This is not only costly, but can also bring danger. If the external light falls accidentally into the aquarium water and does not have safety features, there is a risk of electrical shock.

Therefore, there is a need for an improvement in aquarium lighting, which allows lighting into the aquarium interior during servicing when the lid is pivoted open, and which avoids the dangers of external lighting, such as electrical shock.

SUMMARY

A light system for an aquarium is provided that improves the prior art.

In general, a light system for an aquarium includes an aquarium tank and a lid covering the open top of the tank. The tank has a surrounding wall defining an interior volume and an open top in communication with the interior volume. The lid is pivotably attached to the tank and is pivotable between a covered position and uncovered position. The lid has an interior portion in communication with the interior volume, when the lid is in the covered position. A light source is secured to the interior portion of the lid and moves with the lid between the covered position and uncovered position. The light source emits a light beam. An alignment arrangement is provided for the light source and is constructed and arranged to ensure the light beam projects into the tank interior volume regardless of the position of the lid and light source.

In some implementations, the alignment arrangement includes a pivotable shield secured to the interior portion of the lid and moving with the lid between the covered position and uncovered position. The shield pivots by gravity to a position deflecting the light beam into the tank interior, when the lid is moved to the uncovered position.

The alignment arrangement can include a pair of swivel joints extending between the lid and opposite ends of the shield.

The light source can be a florescent light bulb fixed at opposite ends.

In other arrangements, the alignment arrangement can include a pair of articulated joints between the lid and the light source, wherein the articulated joints permit the light source to pivot with gravity to project the light beam continuously into the tank interior, when the lid is moved between the covered position and uncovered position.

The light source can be a florescent light bulb fixed at opposite ends to the articulated joints.

In some embodiments, the alignment arrangement can include a pulley system to rotate the light source when the lid is moved between the covered position and uncovered position.

In example arrangements, the lid is connected to the tank along a hinge joint, and the pulley system includes a belt-pulley system having a first wheel connected to the hinge joint, and a second wheel connected to the light source, and a belt around each of the first wheel and second wheel. When the lid is moved along the hinge joint between the covered position and the uncovered position, the first wheel rotates and translates motion to the belt causing the second wheel to rotate and rotate the light source.

In example arrangements, the light source is a florescent light bulb secured at opposite ends to the pulley system.

In another aspect, a method of providing lighting into an interior of an aquarium of provided. The aquarium includes a tank having a surrounding wall defining an interior volume; an open top in communication with the interior volume; a lid pivotably covering the open top of the tank; and a light source secured to the interior portion of the lid and moving with the lid. The method includes a step of pivoting the lid from a position covering the tank to a position exposing the open top of the tank. The method further includes a step of using an alignment arrangement for the light source to ensure a light beam from the light source projects into the tank interior volume regardless of the position of the lid and light source.

Other aspects of this disclosure will become apparent by consideration of the detailed description and accompanying drawings.

DETAILED DESCRIPTION

Figure 1:
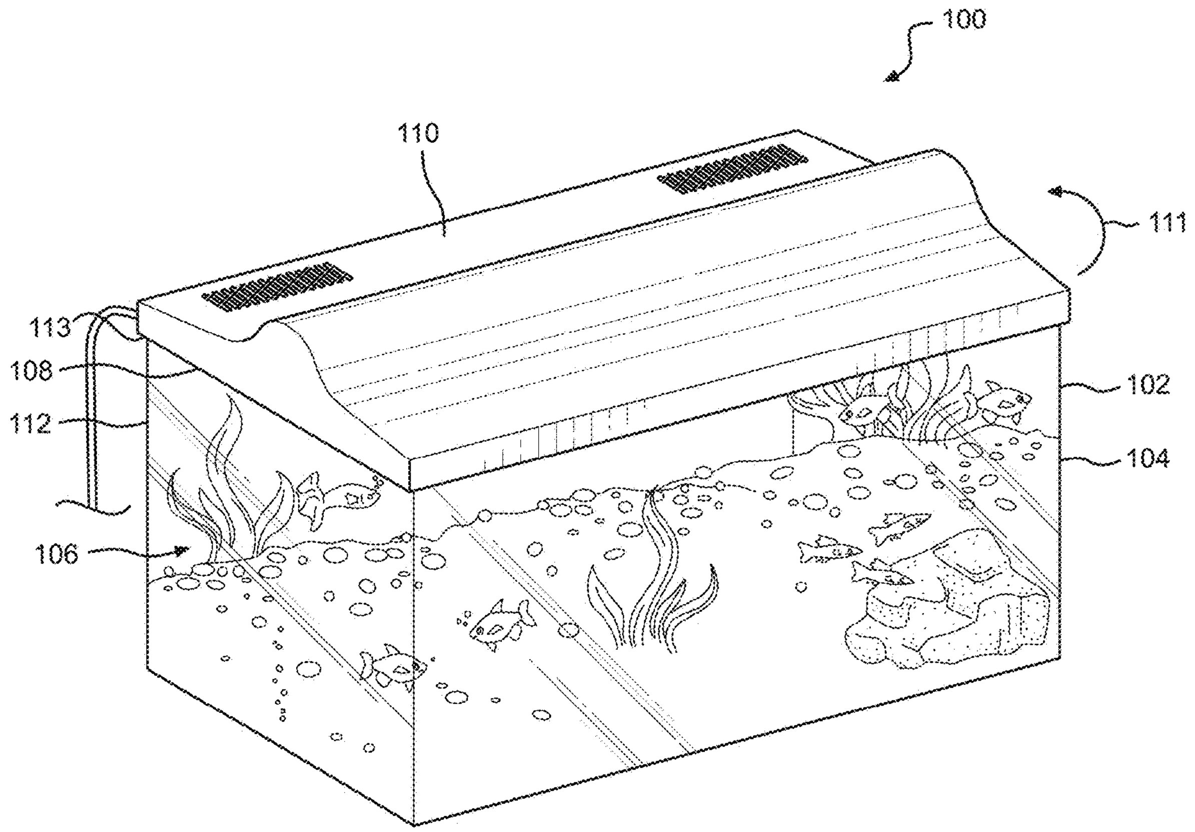
FIG. 1 is a perspective view of an aquarium having a light system, constructed in accordance with principles of this disclosure.
Figure 2:
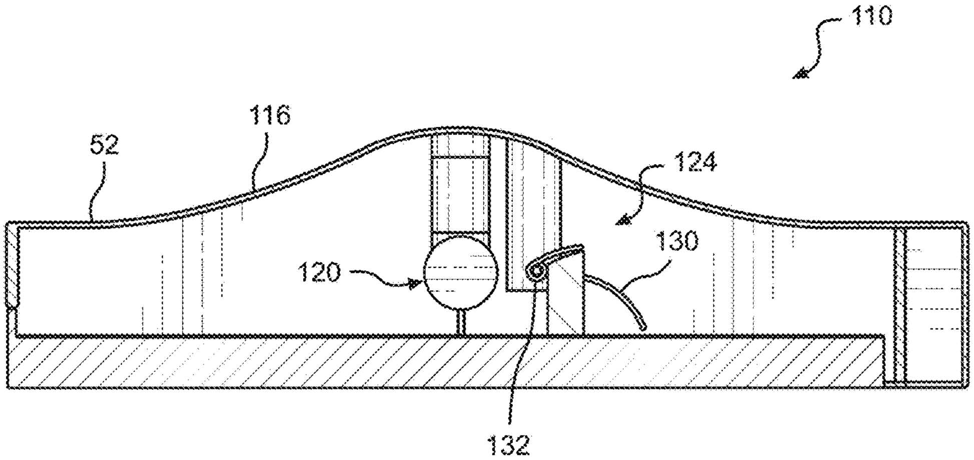
FIG. 2 is a side view of a first embodiment of a lid assembly having a light system, constructed in accordance with principles of this disclosure.
Figure 3:
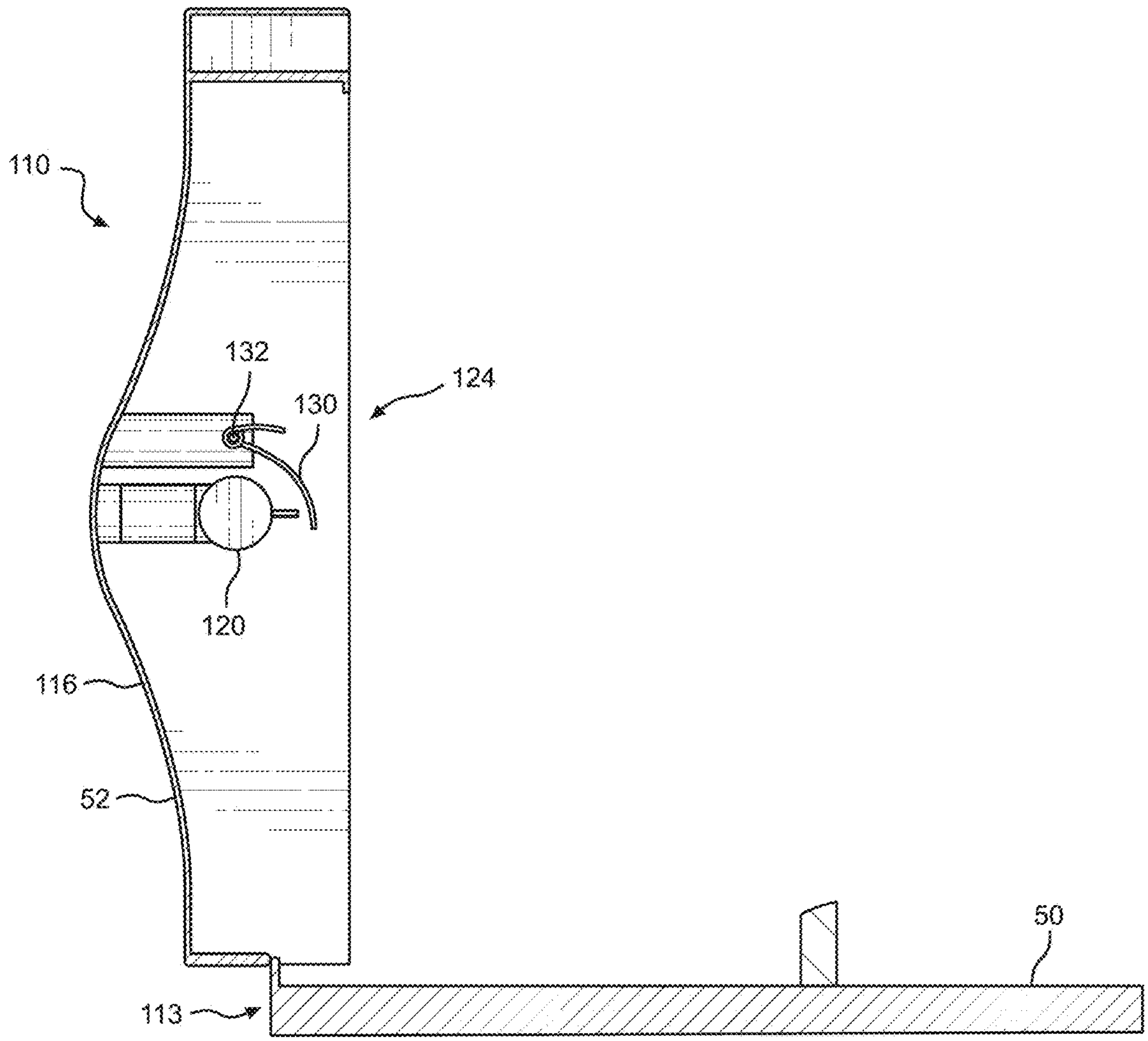
FIG. 3 is a side view of the lid assembly of FIG. 2, but pivoted to be in the uncovered position.
Figure 4:
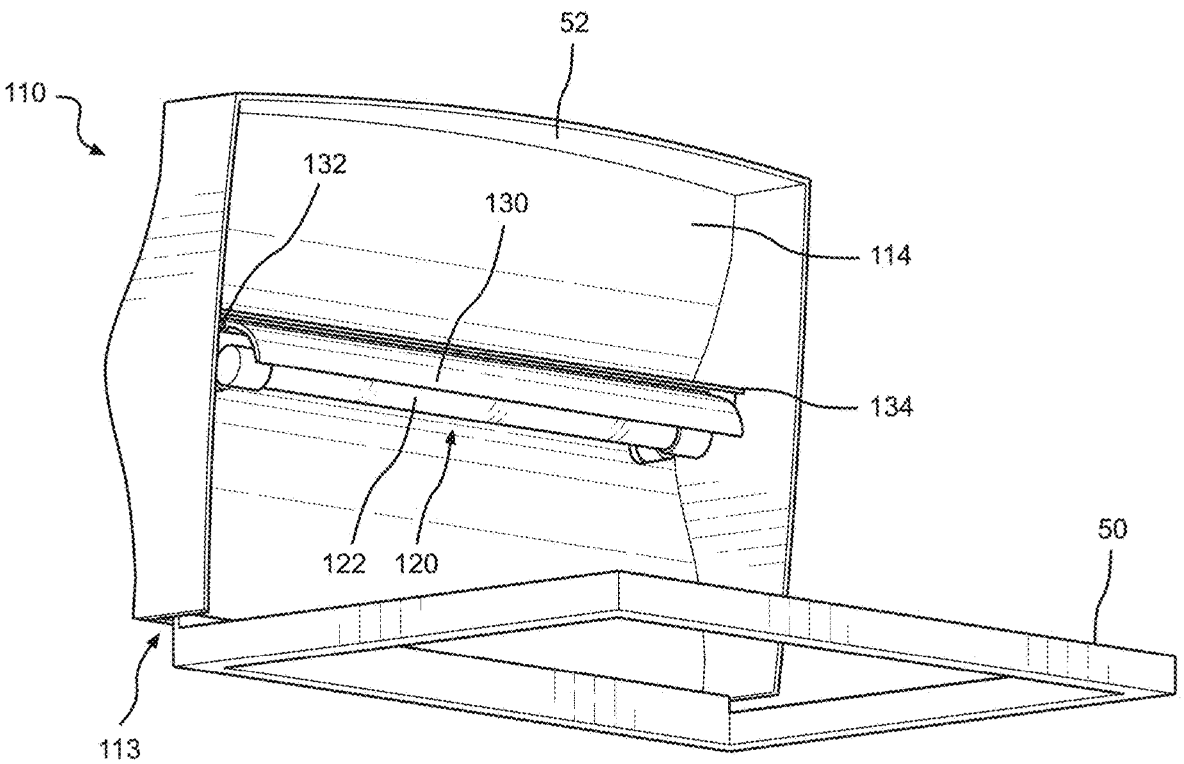
FIG. 4 is a perspective view of the lid assembly of FIG. 3 in the uncovered position.
Figure 5:
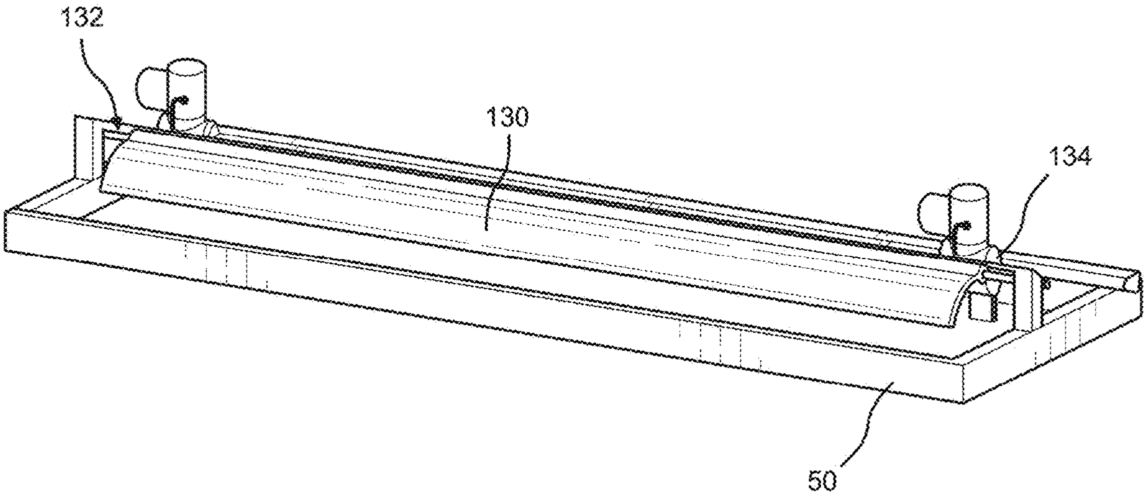
FIG. 5 is a perspective view of a portion of the lid assembly of FIGS. 2-4, with the lid removed to reveal components on the underside of the lid.
Figure 6:
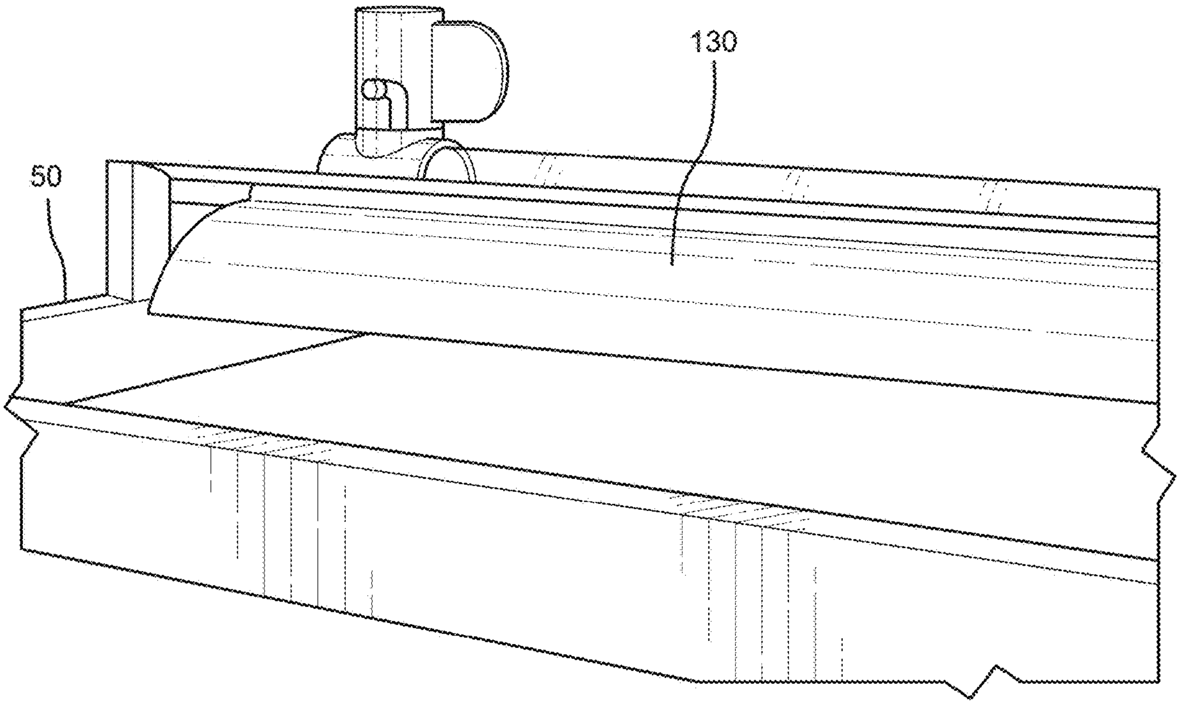
FIG. 6 is an enlarged view of a portion of FIG. 5.
Figure 7:
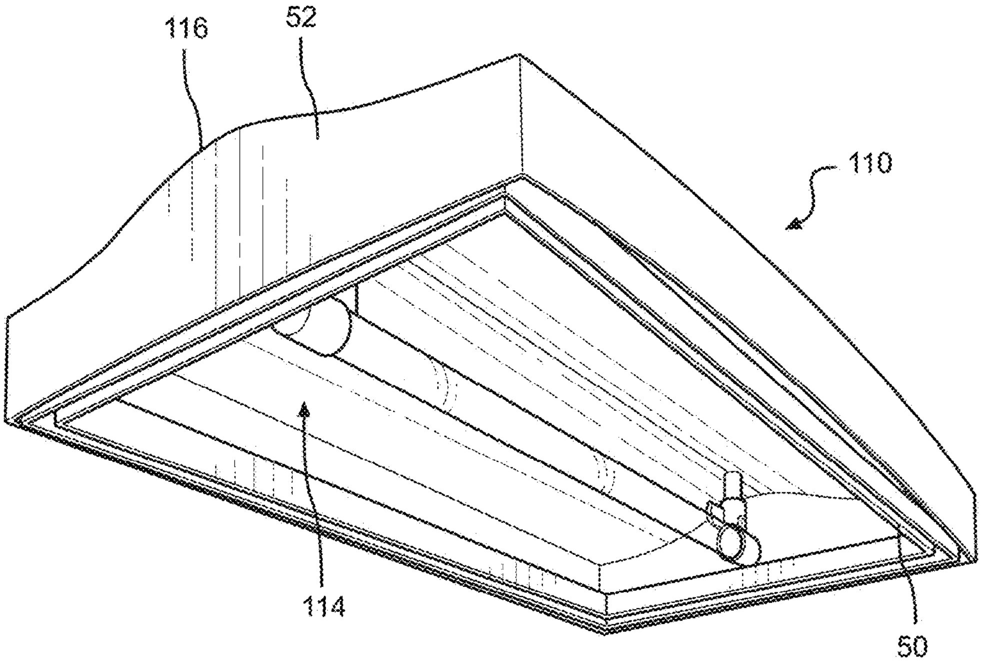
FIG. 7 is a perspective view of a second embodiment of the lid assembly for use in an aquarium, in which the lid is in the covered position.

FIG. 1 illustrates an aquarium 100. The aquarium 100 includes a tank 102 having a surrounding wall 104 defining an interior volume 106. Within the interior volume 106 is typically water, although the tank 102 can be for sustaining non-aquatic habitats, as well.

Along the upper portion of the surrounding wall 104 is an open top 108 in communication with the interior volume 106.

A lid assembly 110 assembly is illustrated covering the open top 108 of the tank 102. The lid assembly 110 includes a frame 50 secured to the free terminal end of the top of the surrounding wall 104 and a lid 52 in pivotable relation to the frame 50. The frame 50 is typically secured to the tank wall 104, and the lid 52 is removable, such that the interior volume 106 of the tank 102 can be accessed. In many example systems, the lid assembly 110 is oriented relative to the tank wall such that the lid 52 pivots relative to the frame 50 adjacent a rear wall 112 of the tank wall 104 at a pivot connection 113. The pivot connection 113 can be with hinges other suitable attachments. The lid 52 can be pivotable between the covered position as shown in FIG. 1 and an uncovered position, in which the lid 52 is pivoted along arrow 111 about the pivot connection 113 so that the interior volume 106 can be accessed through the top 108.

In reference now to FIGS. 2-14, the lid 52 has an interior portion 114 that is in communication with the interior volume 106, when the lid 52 is in the covered position. Opposite of the interior portion 114 is an exterior portion 116.

The lid assembly 110 has a light source 120. The light source 120 can be secured to the interior portion 114 and moved with the lid 52 between the covered position and uncovered position. The light source 120 emits a light beam. In many typical systems, the light source 120 is a florescent light bulb 122 fixed to the interior portion 114 of the lid 52 at opposite ends.

In accordance with principles of this disclosure, the light system includes an alignment arrangement 124. The alignment arrangement 124 is for the light source 120 and is constructed and arranged to ensure that the light beam projects into the tank interior volume 106 regardless of the position of the lid 52 and light source 120. This will provide the advantage of having light into the interior volume 106, while servicing the aquarium 106 with the lid 52 pivoted into the uncovered position while avoiding having the light beam shine directly into the eyes of the person servicing the aquarium 100.

In reference now to the embodiment of FIGS. 2-6, a first embodiment of the alignment arrangement 124 is illustrated. In this embodiment, the alignment arrangement 124 includes a pivotable shield 130. The shield 130 is secured to the interior portion 114 of the lid 52 and moves with the lid 52 between the covered position and uncovered position. The shield 130 pivots by gravity to a position deflecting the light beam into the tank interior volume 106, when the lid 52 is moved to the uncovered position.

The alignment arrangement 124 includes a pair of swivel joints 132, 134, at opposite ends of the light bulb 122. The swivel joints 132, 134 extend between the lid 52 and opposite ends of the shield 130. As can be seen by comparing FIGS. 2 and 3, the shield 130 swivels or rotates with gravity about the swivel joints 132, 134 when the lid 52 pivots between the covered position of FIG. 2 and the uncovered position of FIG. 3. In this way, the light beam is always projecting into the interior of the tank 102 and prevented from shining into the eyes of the person servicing the aquarium 100.

In reference now to FIGS. 7-10, a second embodiment of the alignment arrangement 124 is illustrated. In this embodiment, the alignment arrangement 124 includes a pair of articulated joints 140, 142 between the lid 52 and the light source 120. The articulated joints, 140, 142 permit the light source 120 to pivot with gravity to project the light beam continuously into the tank interior volume 106, when the lid 52 is moved between the covered position and uncovered position.

The light source 120 is typically a florescent light bulb 122, fixed at opposite ends to the articulated joints 140.

Figure 8:
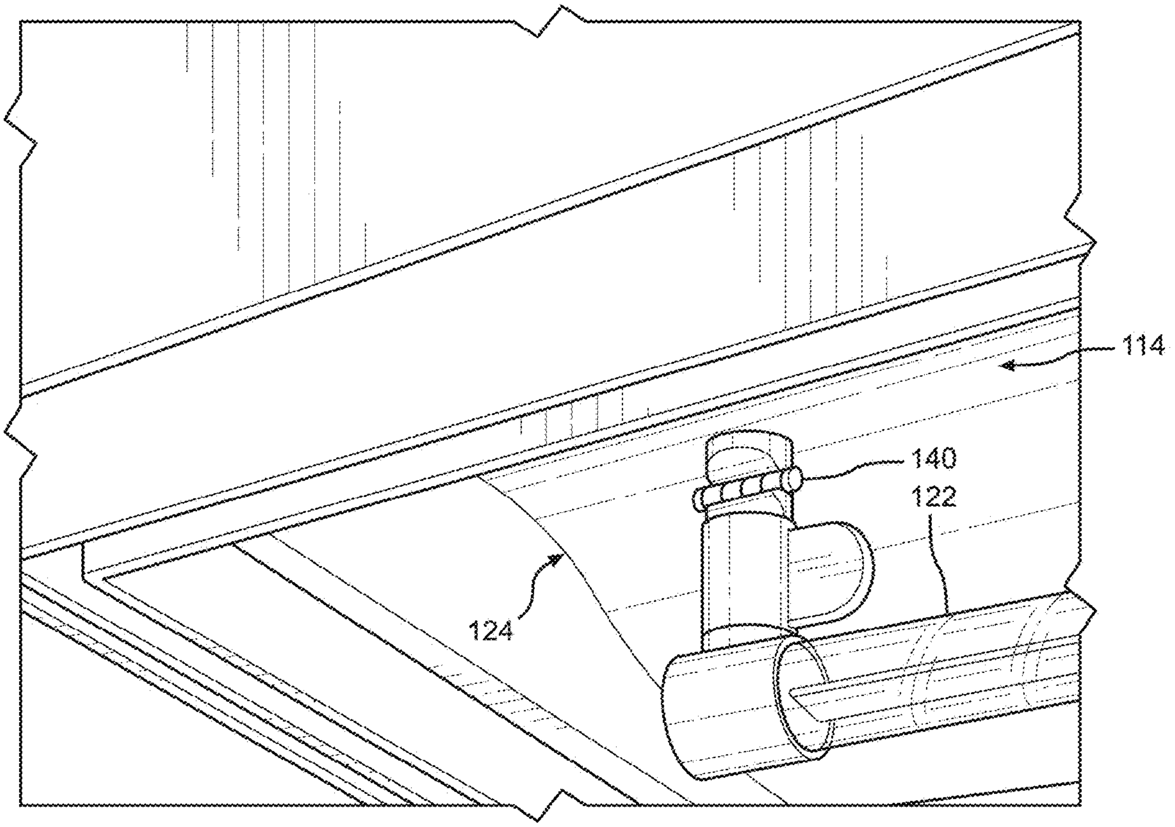
FIG. 8 is a perspective view of an enlarged portion of the lid assembly of FIG. 7.
Figure 9:
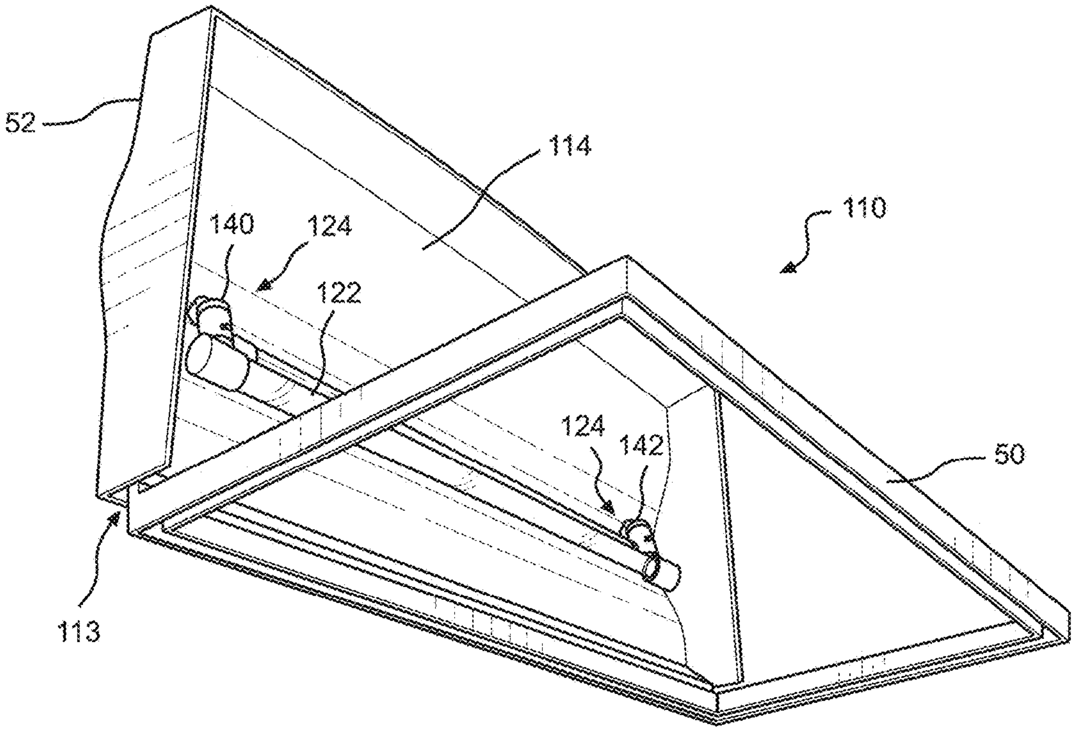
FIG. 9 is a perspective view of the lid assembly of FIG. 7, but with the lid pivoted into an uncovered position.
Figure 10:
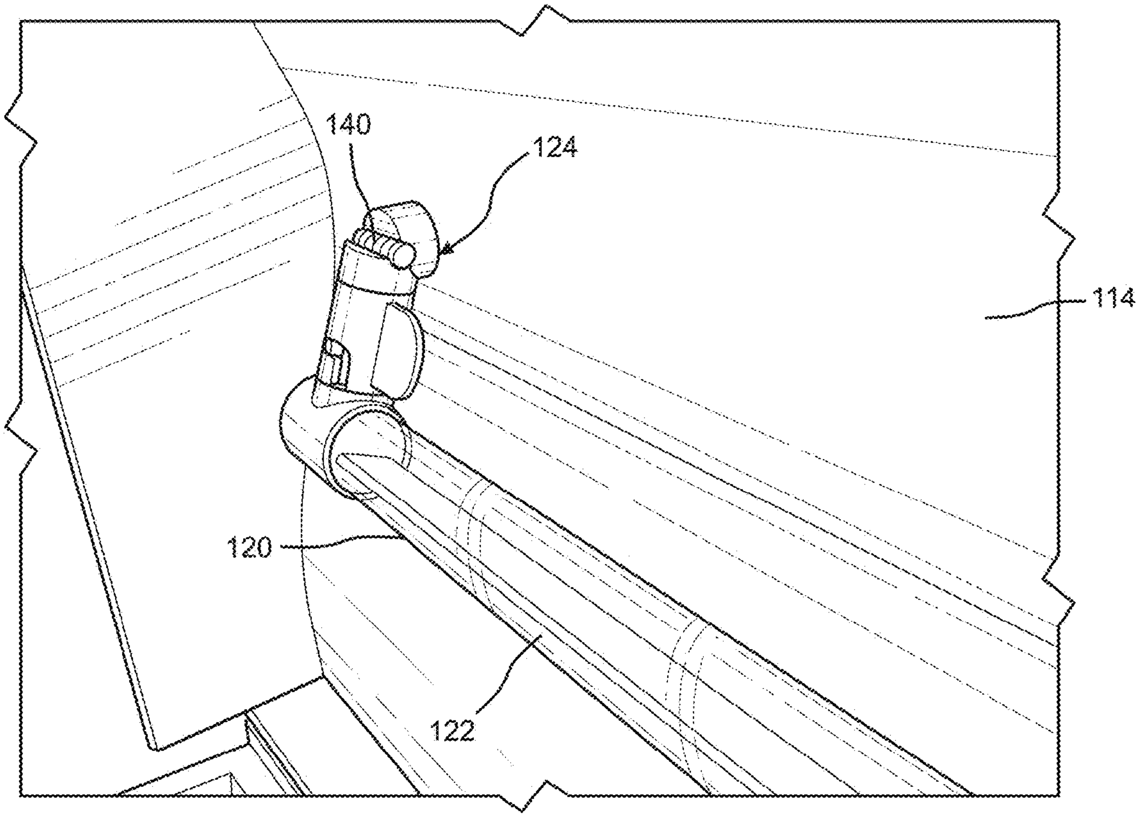
FIG. 10 is a perspective view of an enlarged portion of FIG. 9.
Figure 11:
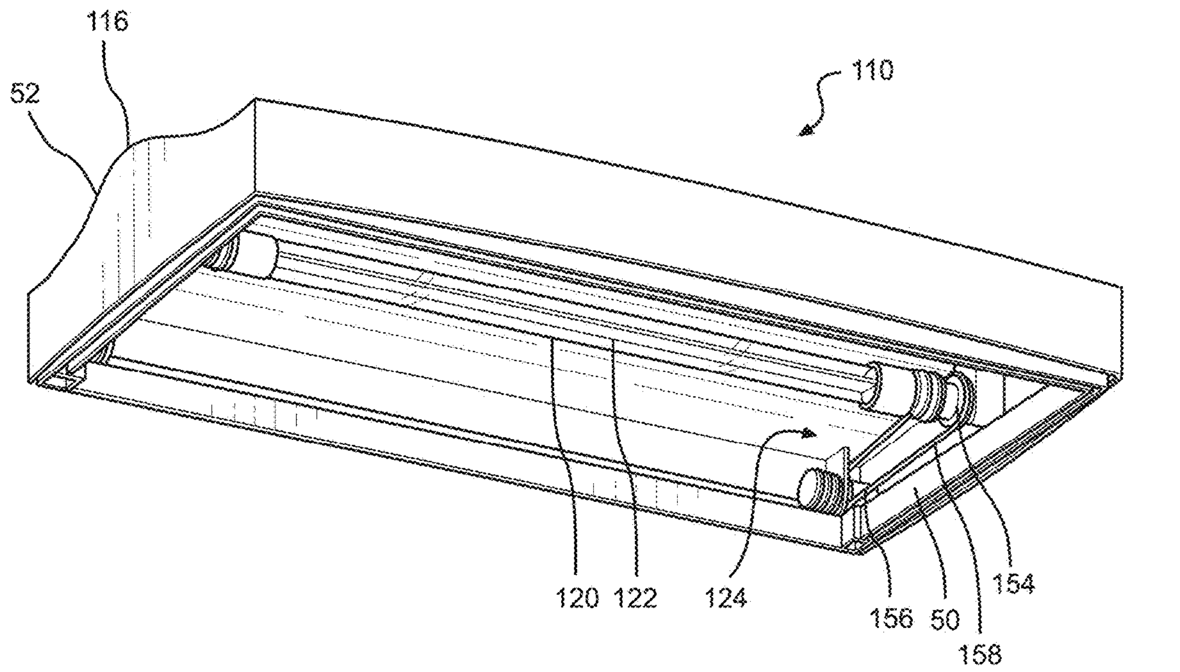
FIG. 11 is a perspective view of a third embodiment of a lid assembly used with the aquarium, the lid being in a covered position.
Figure 12:
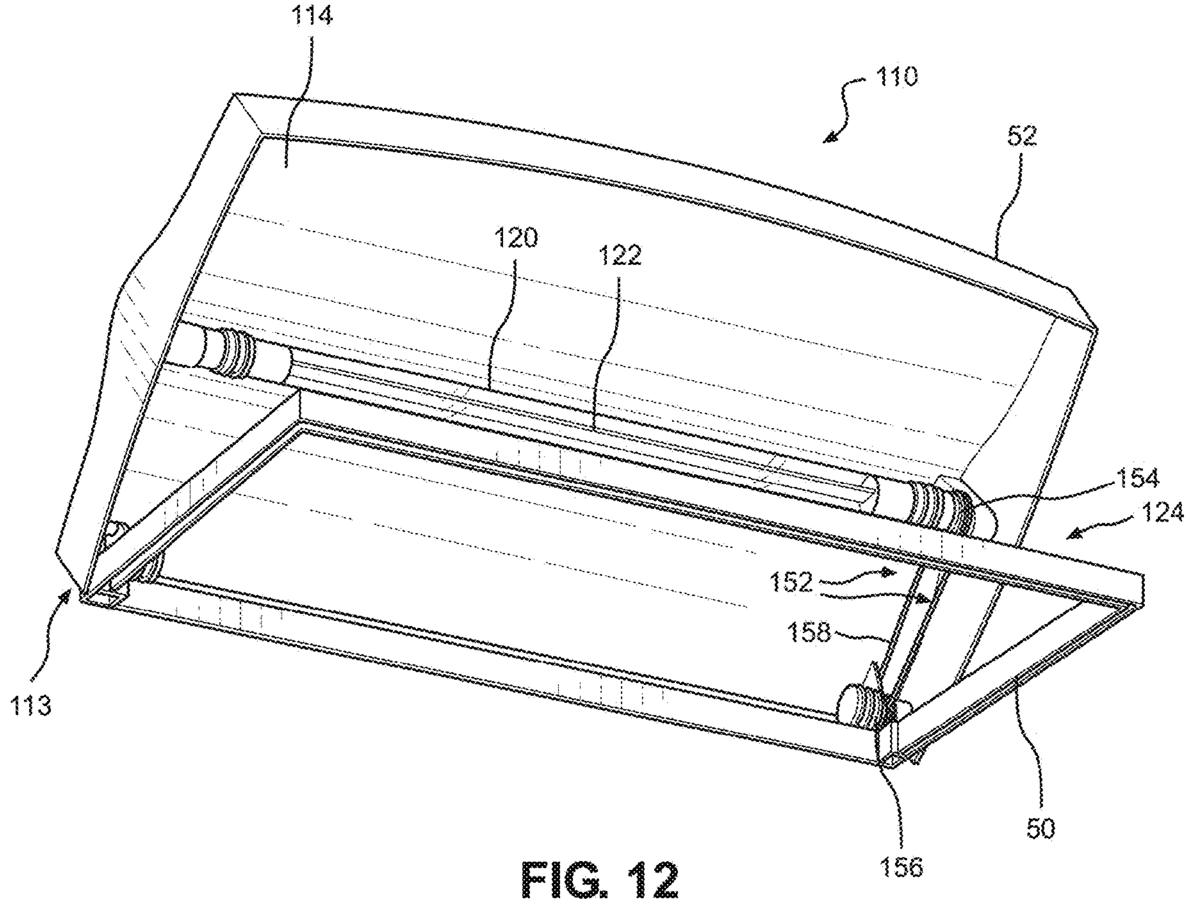
FIG. 12 is a perspective view of the lid assembly of FIG. 11 and with the lid partially pivoted into an uncovered position.

It can be seen by comparing FIG. 8 to FIG. 10 how the light bulb 122 pivots by gravity such that: (i) when the lid 52 is in the covered position, the light beam is directed into the tank interior volume 106; and (ii) when the lid 52 is in the uncovered position, the light bulb 122 pivots along the articulated joints 140, 142 so that the light source 120 is still directed into the interior volume 106 due to rotating about the articulated joints 140, 142.

In reference now to FIGS. 11-14, a third embodiment of the alignment arrangement 124 is illustrated.

Figure 13:
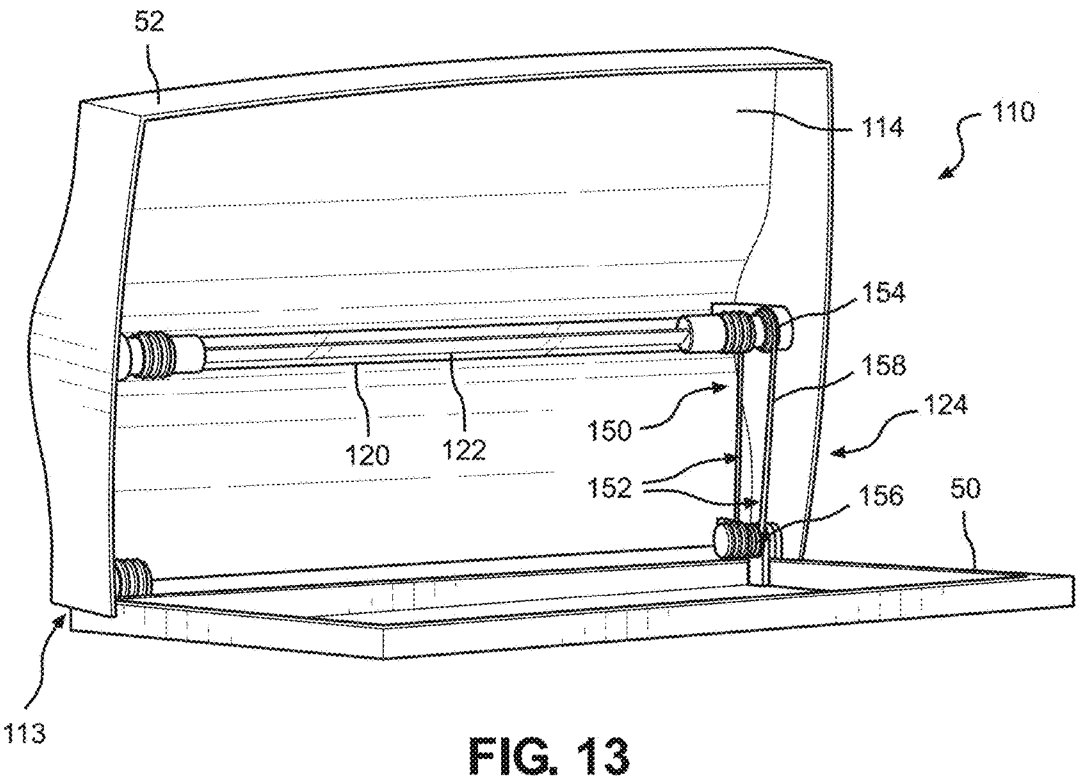
FIG. 13 is a perspective view of the lid assembly of FIG. 11 and with the lid pivoted into the uncovered position.
Figure 14:
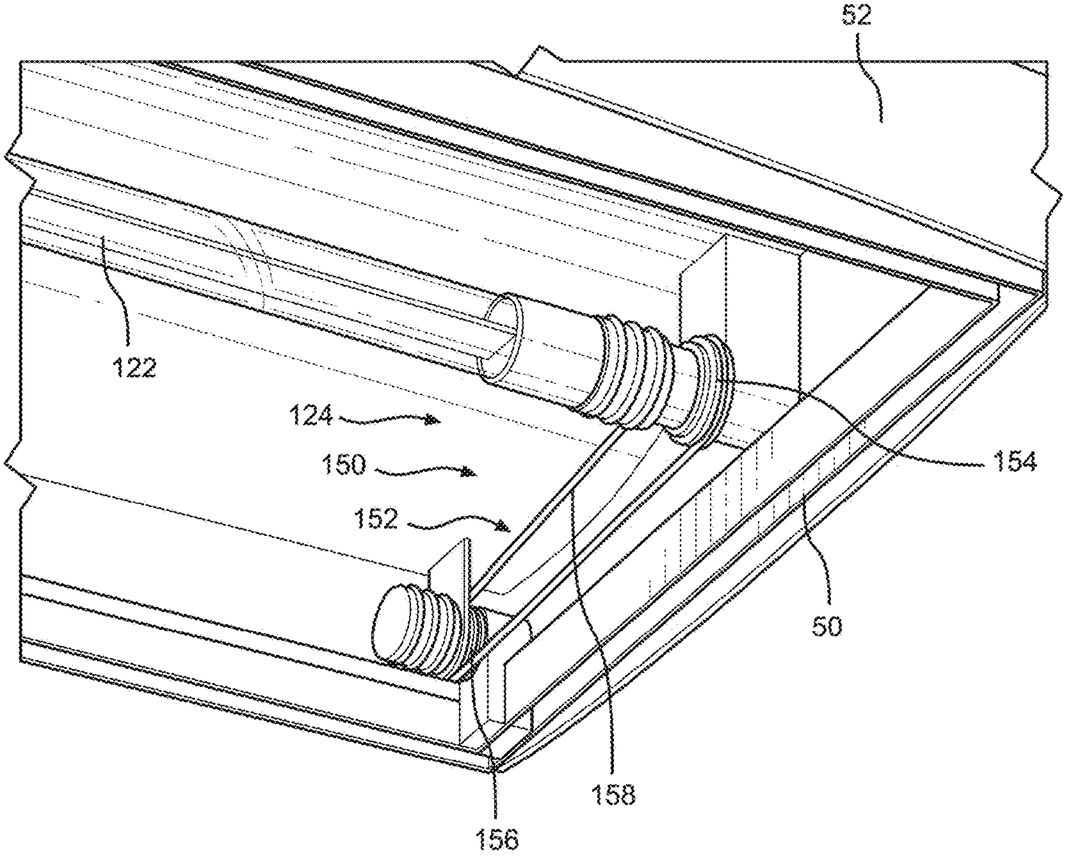
FIG. 14 is an enlarged perspective view of a portion of the lid assembly of FIG. 11.

In the embodiment of FIGS. 11-14, the alignment arrangement 124 includes a pulley system 150 (FIG. 13). The pulley system 150 can be used to rotate the light source 120 when the lid 52 is moved between the covered position and uncovered position.

Many embodiments are possible. In the example shown, the pulley system 150 includes a belt-pulley system 152 having at least: a first wheel 154 connected to the hinge joint 113; a second wheel 156 connected to the light source 120; and a belt 158 connected to the hinge joint 113. The belt 158 is around each of the first wheel 154 and second wheel 156.

In variations, the belt-pulley system 152 can also include a pair of first wheels at opposite ends of the light source 120; a pair of second wheels at opposite ends of the hinge joint 113; and a pair of belts connecting the first and second wheels.

When the lid 52 is moved along the hinge joint 113 between the covered position and uncovered position, the first wheels 154, 160 rotate and translate motion to the belts 158, 164, causing the second wheels 156, 162 to rotate and rotate the light source 120. In this manner, the light beam projects into the tank interior 106, regardless of the position of the lid 52. In this embodiment, the light source 120 is also florescent lightbulb 122 secured at opposite ends to the pulley system 150.

These systems can be used in a method of providing lighting into the interior volume 106 of the aquarium 100. The method includes pivoting the lid 52 from a position covering the tank 102 to a position exposing the top 108 of the tank 102. The method includes using the alignment arrangement 124 to ensure that the light beam from the light source 120 projects into the tank interior volume 106 regardless of the position of the lid 52 and light source 120.

The above represents example principles. Many embodiments can be made using these principles.

What is claimed is:

1. A light system in combination with an aquarium tank; the system comprising:

(a) an aquarium tank having a surrounding wall defining an interior volume; an open top in communication with the interior volume;

(b) a lid covering the open top of the tank; the lid being pivotably attached to the tank and being pivotable between a covered position and uncovered position; the lid having an interior portion in communication with the interior volume, when the lid is in the covered position;

(c) a light source secured to the interior portion of the lid; the light source emitting a light beam; and (d) an alignment arrangement for the light source constructed and arranged to ensure the light beam projects into the tank interior volume regardless of the position of the lid, wherein the alignment arrangement includes a pivotable shield secured to the interior portion of the lid, wherein the pivotable shield is pivotable by gravity from a first position when the lid is in the covered position to a second position when the lid is in the uncovered position, wherein the light source is not covered by the pivotable shield when the pivotable shield is in the first position, and wherein at least a portion of the light source is covered by the pivotable shield when the pivotable shield is in the second position to deflect the light beam into the tank interior.

2. The system of claim 1, wherein the alignment arrangement includes a pair of swivel joints extending between the lid and opposite ends of the shield.

3. The system claim 1, wherein the light source is a fluorescent light bulb fixed at opposite ends.

4. A method of providing lighting into an interior of an aquarium, the method comprising:

(a) providing an aquarium having: (i) a tank having a surrounding wall defining an interior volume and an open top in communication with the interior volume and (ii) a lid pivotably attached to the tank and being pivotable between a covered position and uncovered position, wherein the lid has an interior portion in communication with the interior volume of the tank when the lid is in the covered position, wherein a light source emitting a light beam is secured to the interior portion of the lid, wherein a pivotable shield is secured to the interior portion of the lid, wherein the pivotable shield is pivotable by gravity from a first position when the lid is in the covered position to a second position when the lid is in the uncovered position, wherein the light source is not covered by the pivotable shield when the pivotable shield is in the first position, and wherein at least a portion of the light source is covered by the pivotable shield when the pivotable shield is in the second position; and (b) pivoting the lid from the covered position to the uncovered position to expose the open top of the tank, wherein the pivotable shield pivots by gravity from the first position to the second position to cover at least a portion of the light source to ensure the light beam from the light source projects into the tank interior volume.

5. The method of claim 4, wherein a pair of swivel joints are secured to the interior portion of the lid at each end of the light source.

6. The method of claim 5, wherein each swivel joint extends between the interior portion of the lid and to an opposite end of the pivotable shield.

* * * * *